(12) United States Patent
Soelch et al.

(10) Patent No.: US 9,314,815 B2
(45) Date of Patent: Apr. 19, 2016

(54) METHOD FOR MAKING A BEARING HAVING A SELF-LUBRICATING SURFACE COATING

(71) Applicant: New Hampshire Ball Bearings, Inc., Chatsworth, CA (US)

(72) Inventors: Richard Soelch, Sanbornton, NH (US); Grant A. Drew, Sanbornton, NH (US); Thomas Auletto, Northfield, NH (US)

(73) Assignee: NEW HAMPSHIRE BALL BEARING, INC., Peterborough, NH (US)

( * ) Notice: Subject to any disclaimer, the term of this patent is extended or adjusted under 35 U.S.C. 154(b) by 154 days.

(21) Appl. No.: 14/067,041

(22) Filed: Oct. 30, 2013

(65) Prior Publication Data

US 2014/0050859 A1    Feb. 20, 2014

Related U.S. Application Data

(62) Division of application No. 13/108,677, filed on May 16, 2011.

(51) Int. Cl.

| | |
|---|---|
| *B05D 3/10* | (2006.01) |
| *B05D 1/38* | (2006.01) |
| *B05D 3/02* | (2006.01) |
| *B05D 3/12* | (2006.01) |
| *B05D 3/14* | (2006.01) |
| *C09D 147/00* | (2006.01) |
| *F16C 33/20* | (2006.01) |
| *F16L 33/20* | (2006.01) |
| *C08L 27/18* | (2006.01) |
| *C08K 7/02* | (2006.01) |

(52) U.S. Cl.
CPC .. *B05D 3/10* (2013.01); *B05D 1/38* (2013.01); *B05D 3/0254* (2013.01); *B05D 3/12* (2013.01); *B05D 3/142* (2013.01); *C09D 147/00* (2013.01); *F16C 33/201* (2013.01); *C08K 7/02* (2013.01); *C08L 27/18* (2013.01); *F16C 2202/50* (2013.01); *F16C 2208/72* (2013.01); *F16C 2208/90* (2013.01)

(58) Field of Classification Search
None
See application file for complete search history.

(56) References Cited

U.S. PATENT DOCUMENTS

| | | | |
|---|---|---|---|
| 3,526,678 A * | 9/1970 | Snelgrove et al. | 525/58 |
| 3,929,396 A | 12/1975 | Orkin | |
| 3,996,143 A | 12/1976 | Nagy et al. | |
| 4,053,665 A | 10/1977 | Nagy | |
| 4,060,287 A | 11/1977 | Orkin | |
| 4,134,842 A | 1/1979 | Nagy | |
| 5,265,965 A | 11/1993 | Bozych | |
| 5,288,354 A | 2/1994 | Bozych | |
| 5,431,500 A | 7/1995 | Bozych | |
| 5,470,414 A | 11/1995 | Bozych | |
| 5,494,357 A | 2/1996 | Bozych | |
| 5,560,103 A | 10/1996 | Bozych | |
| 5,762,424 A | 6/1998 | Bozych | |
| 5,767,218 A | 6/1998 | Becker | |
| 6,034,180 A | 3/2000 | Suzuki et al. | |
| 6,180,574 B1 | 1/2001 | Ryan | |
| 6,548,188 B1 | 4/2003 | Yanase | |
| 6,710,593 B2 | 3/2004 | Babin | |
| 7,147,378 B2 | 12/2006 | Chu | |
| 7,278,788 B2 | 10/2007 | Fish | |
| 7,604,412 B2 | 10/2009 | Smith | |
| 2001/0039205 A1 * | 11/2001 | Adams et al. | 463/29 |
| 2001/0039305 A1 | 11/2001 | Nakamaru et al. | |
| 2003/0095729 A1 | 5/2003 | Krakowski et al. | |
| 2005/0175266 A1 | 8/2005 | Broding et al. | |
| 2006/0062502 A1 | 3/2006 | Hupp | |
| 2007/0028805 A1 | 2/2007 | Craciun et al. | |
| 2007/0123652 A1 * | 5/2007 | Chu et al. | 525/167 |
| 2009/0257694 A1 | 10/2009 | DiMartino | |
| 2009/0275685 A1 * | 11/2009 | Hamel et al. | 524/404 |
| 2011/0244158 A1 * | 10/2011 | Murakami et al. | 428/35.8 |

FOREIGN PATENT DOCUMENTS

| | | |
|---|---|---|
| EP | 0372559 A1 | 6/1981 |
| WO | 2009135094 A1 | 11/2009 |

OTHER PUBLICATIONS

Nikolaev, A. F. et al; Polymeric Composition for Friction Assembly Parts Chemical Abstracts Service, Columbus Ohio; retrieved from STN Database accession No. 1981-516560; Leningrad Technological Institute USSR Jun. 15, 1981.

International Search Report and Written Opinion from corresponding PCT Appln. No. PCT/US2012/036983 dated Aug. 1, 2012.

* cited by examiner

*Primary Examiner* — William Phillip Fletcher, III

(74) *Attorney, Agent, or Firm* — Grossman, Tucker, Perreault & Pfleger, PLLC

(57) ABSTRACT

Methods for making a bearing are disclosed, wherein the bearing includes a substratum and a self-lubricating surface coating composition. The self-lubricating surface coating composition further includes at least one cured thermosetting acrylate and at least one phenolic resin. Methods includes the step of disposing the self-lubricating surface coating composition onto the substratum.

11 Claims, 5 Drawing Sheets

METHOD FOR MAKING A BEARING HAVING A SELF-LUBRICATING SURFACE COATING

CROSS-REFERENCE TO RELATED APPLICATIONS

This application is a divisional of U.S. Pat. No. 9,156,059 B2 entitled "NOVEL SELF-LUBRICATING SURFACE COATING COMPOSITION," having a priority date of May 16, 2011, the disclosure of which is incorporated herein by reference in its entirety.

FIELD OF THE INVENTION

This invention relates generally to the field of self-lubricated surface coatings and especially to bearings that consist of a substratum and a self-lubricating surface coating composition adhered to at least a portion of the substratum.

BACKGROUND OF THE INVENTION

Self-lubricated bearings using polytetrafluoroethylene (PTFE) as a sliding surface have been in use in the aerospace industry since the 1960's according to U.S. Pat. No. 4,666,318 (hereinafter, the 318 patent). The 318 patent teaches that thin films of woven PTFE bearing surfaces are frequently reinforced with sintered bronze and textile yarns such as glass, graphite fibers, or high strength organic yarns of relatively high melting point. Woven structures are usually infused with resin systems such as phenol formaldehyde, epoxies or cyanoacrylates to bind the sliding surface into a dense structure. The 318 patent goes on to teach improved bearings using a reinforced low-friction plastic element consisting of PTFE having a sliding surface and a counterface with a low surface roughness and high hardness.

U.S. Pat. No. 3,996,143 (hereinafter, the 143 patent) describes a bearing surface consisting of a cured mixture of an acrylate composition, a particulate solid lubricant, and organic or inorganic fillers. The bearing surface can be applied by conventional techniques such as spraying, brushing, or dipping. The bearing surface adheres to the substrate and can be built up to any thickness. In addition, the bearing surface conforms easily to the shape of the substrate being coated, can readily be produced in various thicknesses, often can be machined to size, and as such has significant advantage over materials previously employed such as self-lubricating fabrics.

U.S. Pat. No. 4,053,665 teaches a molded bearing assembly with one surface coated by a cured mixture of a curable acrylate composition and particulate PTFE. In addition, U.S. Pat. No. 6,180,574 teaches a self-lubricating liner for bearings which includes a curable acrylate composition and a solid lubricant such as PTFE.

United States Patent Application Publication 2009/0275685, teaches a bearing having a surface and a self-lubricating surface coating composition including a curable acrylate composition having a metallic acrylate compound.

These and other works have advanced the self-lubricated bearing field and in particular the use of cured, self-lubricating acrylate surface compositions. These self-lubricating acrylate surface compositions impart the bearing with many desirable processing advantages and are becoming increasingly important. Still there exists a need for improved bearings with conformable and machinable, self-lubricating surfaces for enhanced service life and improved performance.

SUMMARY OF THE INVENTION

Embodiments of the present invention provide a method for making a bearing having a self-lubricating surface coating. Briefly described, the present invention is directed to a method for making a bearing, wherein the bearing has a substratum and a self-lubricating surface coating composition. The self-lubricating surface coating composition has at least one cured thermosetting acrylate and at least one phenolic resin. The method includes the step of disposing the self-lubricating surface coating composition onto the substratum.

A second aspect of the present invention is directed to a method for making a bearing. The bearing includes a substratum and a self-lubricating surface coating composition, wherein the method includes the steps of disposing an uncured self-lubricating surface coating composition onto the substratum, wherein the self-lubricating surface coating composition further includes at least one thermosetting acrylate and at least one phenolic resin, and curing the self-lubricating surface coating composition to solidify the composition and adhere the composition in place.

Briefly described, a third aspect of the present invention is directed to a method for making a bearing, wherein the bearing has a substratum and a self-lubricating surface coating composition. The method includes the step of disposing a cured self-lubricating surface coating composition onto the substratum, wherein the self-lubricating surface coating composition further includes at least one thermosetting acrylate and at least one phenolic resin.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present invention provides self-lubricated bearings containing a substratum and self-lubricating surface coating composition disposed thereon wherein the self-lubricating surface coating composition further contains at least one cured thermosetting acrylate and at least one phenolic resin. The phenolic resin preferably contains a mixture of phenolic resin and polyvinyl formal resin. The present invention also provides the self-lubricating surface coating composition and several methods of making bearings in accordance with the present invention.

The self-lubricated bearings can be any type and have a surface or substratum of any geometry. Some examples of the more common bearing types are plain journal bearings, flanged journal bearings, spherical bearings, track rollers, roller bearings, loader slot bearings, flat plates, earthquake bearing constructions for buildings, roads, bridges, tunnels, and other bearings. A bearing of the invention is used in any construction where two surfaces are in contact with each other, under some load, and one surface is free to move relative to the other surface, wherein a self-lubricating composition contains at least one of the two surfaces and is disposed on a substratum over at least part of the area where the two surfaces are in movable contact. The surfaces can be of the same or different geometries relative to each other. The self-lubricating composition functions to reduce friction and wear between the two surfaces.

Several representative bearing embodiments are shown in the figures provided herein to illustrate the present invention and different exemplary embodiments of the present invention. It should be noted that the figures herein do not represent a comprehensive list and as such are not intended to be limiting of the invention in any way.

Figure 1:
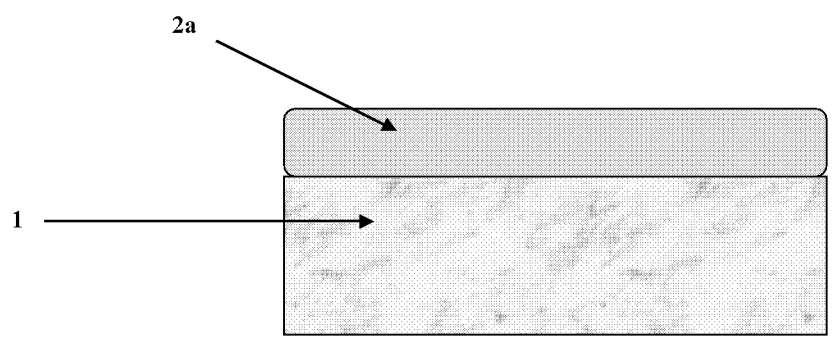
FIG. 1 illustrates a first exemplary embodiment of the invention showing a bearing substratum and a self-lubricating surface coating.

A first exemplary embodiment of the invention is depicted in FIG. 1. A substratum 1 is illustrated as flat for simplicity, but it may be any geometry. A self-lubricating surface coating composition 2a is disposed on the substratum 1 and contains a cured mixture of thermosetting acrylate and phenolic resin. A counter surface of the bearing is not shown for simplicity. The cured mixture of thermosetting acrylate and phenolic resin 2a adhere and conform to the geometry of the substratum 1 and can be any thickness relative to the substratum 1. The self-lubricating surface coating composition 2a is depicted as covering all of the substratum 1, but it also may cover only a portion of the substratum 1.

Figure 2:
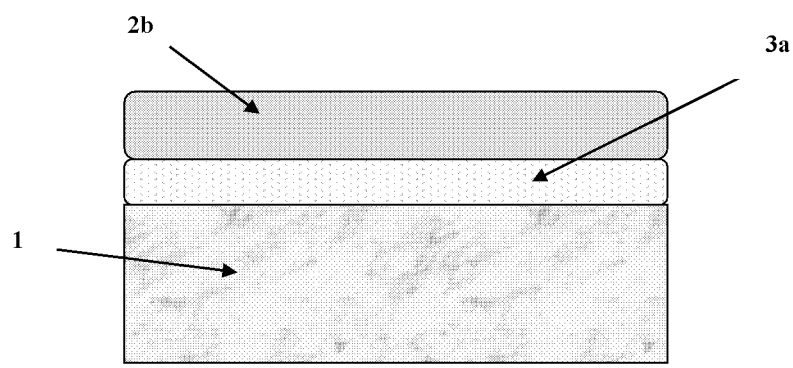
FIG. 2 illustrates a second exemplary embodiment of the invention where the self-lubricating surface coating composition has cured acrylate and phenolic components arranged in a layered structure upon the bearing substratum.

FIG. 2 illustrates a second exemplary embodiment of the invention where the self-lubricating surface coating composition has cured acrylate and phenolic components arranged in a layered structure upon the bearing substratum. Referring to FIG. 2, the self-lubricating surface coating composition is a layered structure containing a cured thermosetting acrylate 2b adhered to the top of phenolic resin 3a. The phenolic resin 3a is adhered to the substratum 1.

Figure 3:
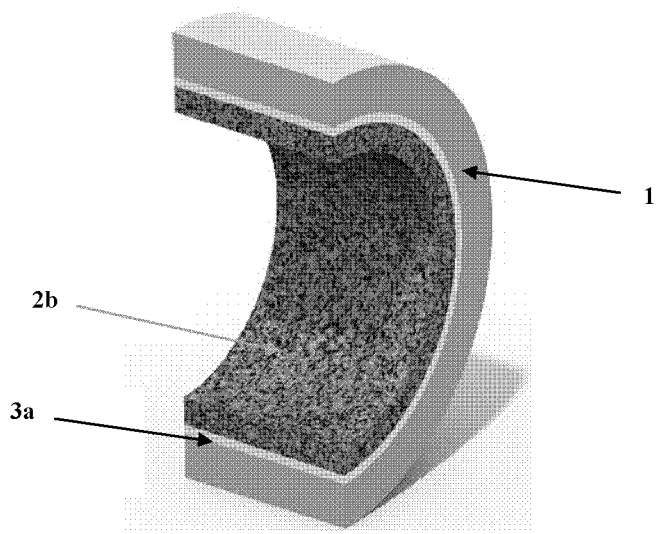
FIG. 3 is a cross section of a journal bearing having the structure of FIG. 2.

FIG. 3 is a cross sectional view of a journal bearing (or sleeve bearing) having the layered structure of FIG. 2. As with all figures, the relative thicknesses of the various layers are not drawn to scale in an effort to provide a clearer depiction of the embodiment.

Figure 4:
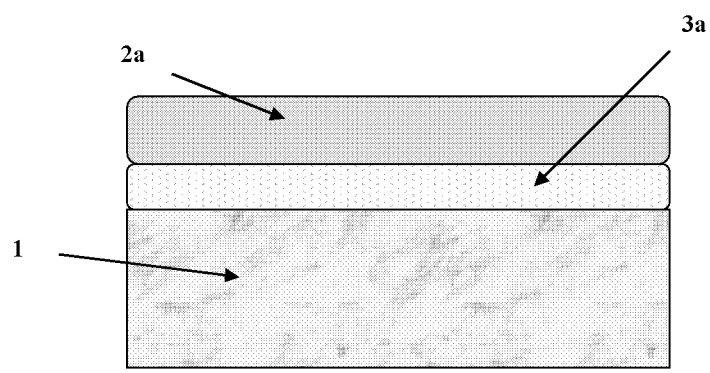
FIG. 4 illustrates a third exemplary embodiment of the invention having a layered self-lubricating surface coating on a bearing substratum.

FIG. 4 illustrates a third exemplary embodiment of the invention having a layered self-lubricating surface coating on a bearing substratum.

The layered self-lubricating composition contains a cured mixture of thermosetting acrylate and phenolic resin 2a adhered to phenolic resin 3a. As shown by FIG. 4, the phenolic resin 3a is adhered to the substratum 1.

Figure 5:
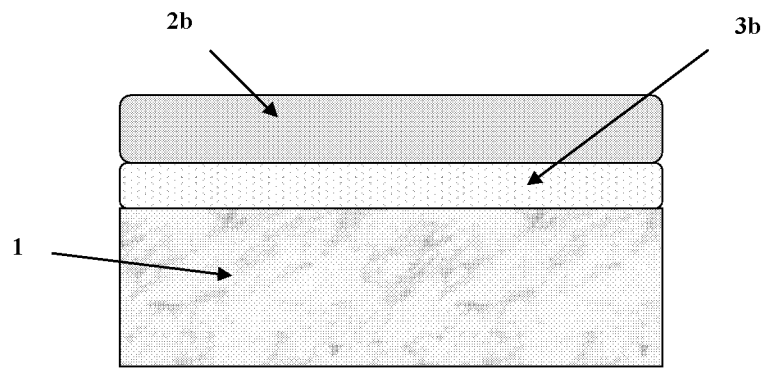
FIG. 5 illustrates a fourth exemplary embodiment of the invention where the self-lubricating composition is a cured thermosetting acrylate disposed upon a cured mixture of phenolic resin and thermosetting acrylate, where the cured mixture of phenolic resin and thermosetting acrylate is coated on a bearing substratum.

Alternatively, in accordance with a fourth exemplary embodiment of the invention, as shown by FIG. 5, the self-lubricating composition may be a cured thermosetting acrylate 2b disposed upon a cured mixture of phenolic resin and thermosetting acrylate 3b. The cured mixture of phenolic resin and thermosetting acrylate 3b covers at least a portion of the substratum 1.

Figure 6:
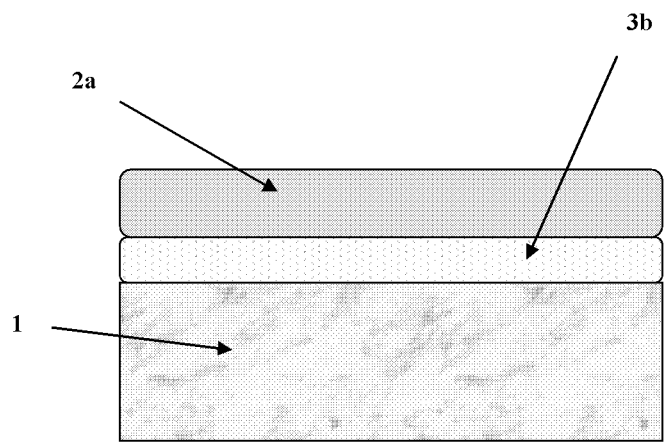
FIG. 6 illustrates a fifth exemplary embodiment of the invention where a cured mixture of phenolic resin and thermosetting acrylate is coated on the substratum with a different cured mixture of thermosetting acrylate and phenolic resin coated as the top layer.

FIG. 6 illustrates a fifth exemplary embodiment of the self-lubricated bearing. As shown by FIG. 6, a cured mixture of phenolic resin and thermosetting acrylate 3b is covering the substratum 1, while a different cured mixture of thermosetting acrylate and phenolic resin 2a is the top layer.

The self-lubricating surface layers 2a, 2b, 3a, 3b in the figures may be any thickness. Typically the total self-lubricating composition thickness is less than 0.100 inches thick, and more typically less than 0.050 inches thick although it may be applied to the substratum 1 in thicknesses of 0.25 inch or greater. It should be noted that in some preferred embodiments, self-lubricating surface layers 3a and 3b are about 0.002 inch in thickness or less. In addition, the self-lubricating surface layers 3a and 3b may be about 0.001 inch thick or less.

Several methods of making the presently disclosed bearings are also provided by the present invention. The self-lubricating composition may be disposed upon the substratum 1 in a fluid state by spraying, brushing, rolling, spinning, molding, coating, or some combination of these, and then curing to solidify the composition and adhere the composition in place. These processes are applicable to the bearings of the invention depicted in all of the figures. One having ordinary skill in the art would also appreciate that other methods of deposing may be used.

Alternatively, a portion of the self-lubricating compositions (2a or 2b, whichever is applicable) of FIGS. 2-6 may be molded or otherwise formed in shape and cured apart from the substratum 1. Layer 3a or 3b, whichever is applicable, is then deposited on the substratum 1 in a fluid state by spraying, brushing, rolling, spinning, molding or otherwise coating. Deposited layer 3a or 3b, whichever is applicable, may optionally then be dried, if it contains a solvent. The hardened shape formed independently is then conjoined with the coated substratum and post-cured to make a self-lubricating bearing of the invention.

It has surprisingly been found, during the course of this work, that a molded or otherwise formed, cured shape containing self-lubricating surface component 2a and/or 2b may also be used as a bearing, in and of itself for certain applications, without needing to be bonded to any substratum 1. The best method for a making a particular bearing of the invention will depend upon the bearing surface geometry, size, intended use and number of bearings required.

The bearing substratum 1 in FIG. 1 may be any material including, but not limited to, aluminum, steel, titanium, stainless steels, metal alloys, composites, polymer alloys, ceramics, or any combination of these. The substratum 1 is used in movable contact with another surface, which is not illustrated in FIG. 1.

In order to optimize overall bearing performance, the bearing substratum 1 finish is prepared prior to applying the self-lubricating surface coating composition. The first step of the substratum finish preparation is to roughen the substratum 1 surface to obtain a specific average roughness or Ra. This roughness can be achieved by a variety of known methods such as, but not limited to: grit blasting with abrasive media; chemical etching: plasma or electrical discharge etching: mechanical roughening to impart a random or specific roughness pattern; and other methods. Any surface roughness can be used but it is preferred to have an Ra value greater than 25 micro-inches as measured with a profilometer using a 0.030 inch cutoff. While not necessary, it is more preferred to have the Ra value above 100 microinches, and in some applications it is even more preferred to have the Ra greater than 150 microinches.

Once the desired substratum roughness is attained the substratum is cleaned to free it of oils, greases and other contaminants and may also optionally be etched, deoxidized, passivated and the like, depending upon known methods of surface preparation for the particular substratum composition.

The acrylate may be any acrylate monomer or oligomer. The acrylate may be acid or ester functionalized or combinations thereof. There are myriad acrylate monomers and oligomers that are useful in the invention and some representative, but non-limiting examples are supplied by the Sartomer Company of Exton, Pa. Monomers and oligomers may be chosen and used alone or mixed together to tailor end use properties such as resin viscosity, abrasion resistance, cross link density, chemical resistance, reactivity, temperature resistance, hardness, adhesion, and other use properties.

The phenolic resin may be any phenolic resin. The phenolic resin may be a resole or novolak or a combination thereof. The phenolic resin is preferably a vinyl phenolic resin, which is a combination of a phenolic resin with a polyvinyl formal resin (sometimes also referred to as polyvinyl formal). Polyvinyl formal is a member of the polymer family and includes, but is not limited to, polymers formed from polyvinyl alcohol and formaldehyde as copolymers with polyvinyl acetate. Another description of polyvinyl formal is modified polyvinyl acetal resins. An example of a vinyl phenolic resin is MVK-7000 obtained from the Maverick Corporation of Blue Ash, Ohio. The phenolic resin may be a thermosetting phenolic resin or it may be a thermoplastic phenolic resin.

Fillers, reinforcements, and modifiers may be added to the acrylate self-lubricating compositions of the invention in order to meet specific end use application requirements. Some typical examples of fillers are fiberglass, fiberglass fabrics, carbon fiber, carbon fiber fabrics, mineral fibers, polymer fibers, clays, mica, glass flake, mineral fillers, carbon black, colorants, aramid fibers and fabrics, various combinations of these and the like.

Lubricants may be added to the self-lubricating surface coating composition to reduce the coefficient of friction and improve wear resistance. Some examples of lubricants include, but are not limited to, polytetrafluoroethylene powders, polytetrafluoroethylene fibers, polytetrafluoroethylene film, activated polytetrafluroethylene fibers, polytetrafluoroethylene lubricants with enhanced wettability which include but are not limited to activated polytetrafluoroethylene fibers, other fluoropolymer based lubricants, graphite, molybdenum disulfide, tungsten disulfide, hexagonal boron nitride, hydrocarbon oils, silicone fluids and polymers, perfluoropolyethers, and other similar lubricants.

Thixotropes may be added to the self-lubricating composition of the invention. Fumed silica is a useful thixotrope. It has been determined that synergistic combinations of fumed silica with modified ureas provide surprisingly good thixotropic performance with half or less the amount of silica typically required.

Curing can be done by any method including heat, light, electron beam, or another method. Standard thermal initiators and photo-initiators are known in the art and can be added to facilitate curing of the self-lubricating composition. Specific examples of known thermal initiators include, but are not limited to, organic peroxides. Various organic peroxides are available from several sources, for instance the Arkema Company or Sigma Aldrich. Examples of peroxides suitable for use in the present invention include, but are not limited to, benzoyl peroxide, cumenehydroperoxide, methyl ethyl ketone peroxide, and combinations thereof. Different peroxides initiate curing at different temperatures and rates. The peroxides are often chosen based on processing and handling considerations. In some cases it may be advantageous to use two or more peroxides to initiate curing at different temperatures or to include a peroxide and photo-initiator to combine ultraviolet light and thermal curing.

Benzoyl peroxide (Luperox® A98) is an effective peroxide useful in the invention. The amount of initiator used is an important factor affecting the pot life of the acrylate composition. The exact acrylate composition chosen is also a factor affecting pot life as different acrylates react at somewhat different rates with the same amount and type of peroxide.

The self-lubricating surface coating composition is most effectively prepared by combining or compounding the ingredients in standard mixers suitable for mixing acrylate, silicone or epoxy-type compositions. Typical mixers useful for preparation of the compositions include planetary mixers, high shear mixers, and other mixers. The ingredients may be combined all at once or in any order. The phenolic resin component may be added along with the other ingredients to the acrylate composition. The phenolic resin component may optionally be added independently to the bearing substratum before combining the acrylate composition with the substratum. The phenolic resin component may optionally be added to the acrylate composition and the same or a different phenolic resin component added to the bearing substratum before adding the acrylate containing phenolic resin composition to the substratum.

Depending upon the exact formulation, type of mixer, and volume mixed it may be advantageous to combine the acrylate and solid fillers either in parts or all at once to promote the most effective mixing. The sequence of filler and additive addition and mixing, as well as mixer speeds and conditions are understood and manipulated by those skilled in the compounding art to control dispersion as well as to manage shear heating that occurs during the mixing process.

It is desirable to have the mixer equipped with capability to mix the ingredients under vacuum in order to properly wet and disperse the fillers or fibers as well as to reduce the oxygen concentration in the final mixture before applying the self-lubricating surface coating composition to the bearing substratum. The final oxygen concentration in the acrylate composition is controlled by the level of vacuum applied. Oxygen concentration is an important parameter that affects pot life of the mixture as well as quality of the self-lubricated bearings of the invention.

The self-lubricating surface coating composition in a fluid form may be disposed on the bearing substratum by a variety of methods (see above). The self-lubricating acrylate composition is then cured to solidify it. At this point in the process the bearing containing a substratum and self-lubricating surface coating composition may be: used as is; machined to size; post-cured; post-cured then machined; or machined then post-cured then machined again. The exact sequence depends upon the bearing design and end use requirements. Post-curing has usually been done at a higher temperature than that used for the initial cure, however this is not a requirement of the invention. Post-curing can further improve the self-lubricated bearing's performance. In some embodiments with certain thermosetting phenolic resins, the thermosetting phenolic resin component does not cure completely until the post-cure process.

The following provides non-limiting examples of the above-mentioned. It should be noted that the following is provided for exemplary purposes and is in no way intended to limit the present invention and/or disclosure.

First Example

Thermosetting Self-Lubricating Surface Coating Composition Preparation

Ingredients (1) and (2) were premixed and heated gently to about 120° F. for about 2 hours to aid dissolution. The resulting solution was allowed to cool to room temperature and the remaining thermosetting acrylate ingredients were added sequentially with mixing.

| Thermosetting Acrylate & Polymer Ingredients | Parts by Volume |
|---|---|
| (1) Tricyclodecane dimethanol diacrylate | 63.6 |
| (2) Tris (2-Hydroxyethyl) Isocyanurate Triacrylate | 23.1 |
| (3) Benzoyl Peroxide | 1.2 |
| (4) Modified Urea | 1.0 |

Reinforcing fillers, lubricants and viscosity modifiers as listed below were then mixed into the thermosetting acrylate mixture until well dispersed.

| Remaining Ingredients | Parts by Volume |
|---|---|
| (5) Glass Fibers | 13.2 |
| (6) Activated PTFE Fiber | 23.6 |
| (7) PTFE Powder | 4.5 |
| (8) Silica | 0.7 |

The combined thermosetting self-lubricating composition was held under vacuum (28 in mercury) with intermittent mixing for three hours. A portion of the mixture was then poured into a pneumatic dispenser cartridge.

Aluminum bushings with a 0.5 inch bore meeting Aerospace Standard Part Number M81934/1-08A12 were prepared by standard methods with a surface roughness (Ra measured with a 0.030 inch cutoff) greater than 150 micro inches. The surface was then ultrasonically cleaned with an alkaline cleaner and the surface etched with Oakite™ Deoxidizer LNC according to standard industry methods.

Second Example (Comparative)

Preparation of a Bearing with Self-Lubricating Thermosetting Acrylate

Figure 7:
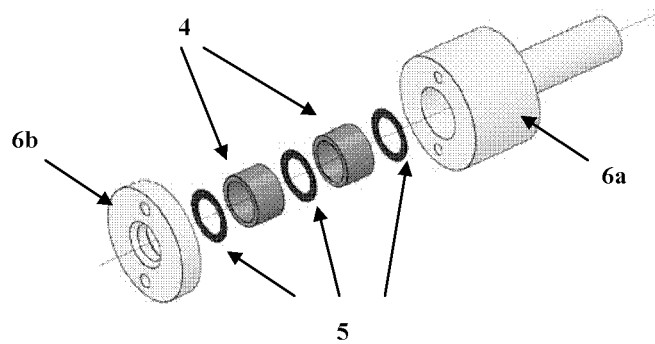
FIG. 7 illustrates a bushing-cylindrical holder assembly in accordance with exemplary use of the present invention.
Figure 8:
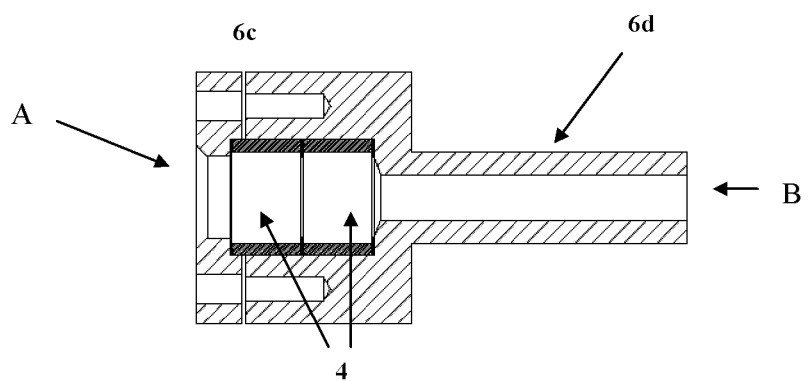
FIG. 8 illustrates a cross-sectional view of the bushing-cylindrical holder assembly of FIG. 7.

Two half inch bushings 4 were placed end-to-end with washers 5 cut from 0.012 inch thick polytetrafluoroethylene fiberglass sheet in an aluminum cylindrical holder 6 as shown in exploded view in FIG. 7 and as a cross sectional assembly in FIG. 8. The washer's (5) internal diameter matched the internal diameter of the self-lubricating liner once it is disposed on the bushing 4 surface. The bushing-cylindrical holder assembly was then placed into a variable speed lathe using a steel Collet. The lathe was equipped with an open passage and nitrogen gas was flowed at 8.7 liters per minute through the lathe and bushing-cylindrical holder assembly (FIG. 8). The bushing-cylindrical holder assembly was then rotated at 38 rpm. A 0.030 inch thick layer of the self-lubricating, thermosetting composition (described above) was deposited by applying 0.930 grams uniformly over the internal bushing surface from an EFD cartridge. The bushing-cylindrical holder assembly rotational speed was then increased to 3000 rpm over 60 seconds. Heated air was blown on the bushing-cylindrical holder assembly surface to heat the surface to about 240° F. over 5 minutes. After ten minutes the spinning speed was decreased to 300 rpm and the surface temperature gradually increased to about 248° F. over the next 20 minutes. The bushing-cylindrical holder assembly was then cooled and bushings removed.

Third Example

Preparation of a Bearing with Self-Lubricating Surface Coating Composition Containing at Least One Cured Thermosetting Acrylate and at Least One Phenolic Resin The internal surfaces of two aluminum bushings, prepared as described above in the Comparative Example, were brush coated by hand with vinyl phenolic resin and air dried at 200° F. for 30 minutes. The dried bushings had about a 0.0005-0.001 inch thick layer of vinyl phenolic resin after drying.

The vinyl phenolic resin coated bushings were placed end-to-end into the aluminum cylindrical holder. The bushing-cylindrical holder assembly was then placed into a variable speed lathe using a steel collet as in the Comparative Example (above). The lathe was equipped with an open passage and nitrogen gas was flowed through the lathe and pot chuck at 8.7 liters per minute. The pot chuck was then rotated at 37 rpm. A 0.030 inch thick layer of the self-lubricating, thermosetting composition was created by applying 0.930 grams uniformly over the internal bushing surface from an adhesive dispenser cartridge. An example of an adhesive dispenser cartridge that may be used in accordance with the present invention is available commercially from Nordson EFD, LLC of East Providence, R.I. The pot chuck speed was then increased to 3000 rpm over 60 seconds. Heated air was blown on the pot chuck surface to heat the chuck surface to about 240° F. over 5 minutes. After ten minutes the spinning speed was decreased to 300 rpm and the surface temperature gradually increased to about 248° F. over the next 30 minutes. The chuck was then cooled and the bushings with the cured acrylate and vinyl-phenolic surface composition removed.

It has generally been observed in these studies that the self-lubricating surface coating composition of the invention containing cured thermosetting acrylate and at least one phenolic resin requires slightly higher temperatures and/or longer times to cure to a solid mass than comparative example thermosetting acrylate without phenolic resin composition.

Machining & Post Curing Example 2 and Example 3 with Self-Lubricating Liners

The approximately 0.030 inch thick, hardened (cured), self-lubricating surface coating composition linings in the bushings were then machined to 0.012 inches. The machining was done on a lathe, without coolant, using a carbide insert with a 0.015 inch nose radius at 2700-4400 inches per minute surface speed with a feed rate below 1.5 inches per minute. The bushings with machined, self-lubricating lining composition were then slid onto aluminum rods with a locational clearance fit.

The aluminum rod-bushing assembly was then placed into a forced air circulating oven to post-cure the self-lubricating composition. The oven was heated from ambient temperature to 340° F. at 2° F. per minute, then held at 340° F. for twenty hours and cooled back to room temperature at 5° F. per minute.

The bushings were removed from the aluminum rod and the self-lubricating composition linings were then machined (as described above) to a final size of 0.010 inches thick for High Temperature Oscillation Testing.

High Temperature Oscillation Testing Machined & Post Cured Example 2 and Example 3 Bearings with Self-Lubricating Liners Two pieces of each bushing (or sleeve bearing) were subjected to the high temperature oscillation under radial load test per Aerospace Standard Specification AS81934, paragraph 4.6.4 and 3.6.4.

Testing was accomplished using two custom made dynamic testing machines. Both machines are hydraulically loaded and have mechanically driven oscillation mechanisms. The test sleeve bearings were installed in such a way as to hold the sleeve bearing static while oscillating the hardened steel pin within the bore by a spindle mounted on roller bearings. The bearings were heated to maintain a temperature of 325° F. during testing with the use of electrical resistance heaters controlled by an electronic heat controller. The thermocouple used to indicate test temperature was located in a drilled hole in the bearing retention housing immediately adjacent to the loaded area of the sleeve bearing.

Figure 9:
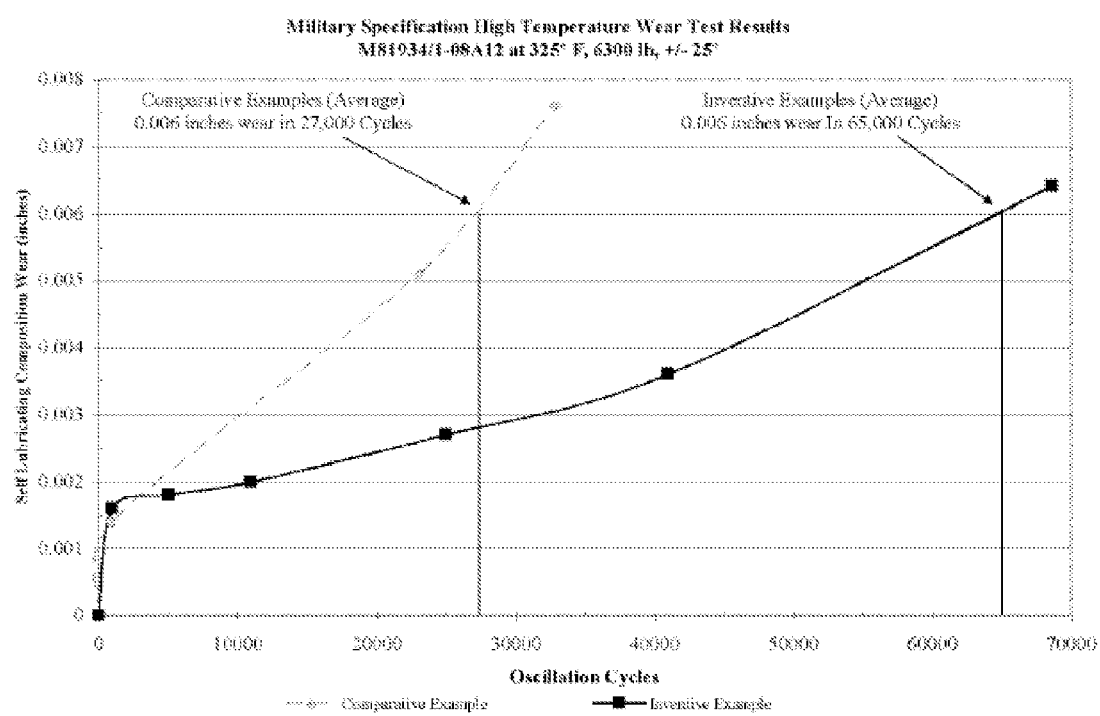
FIG. 9 is a graphical representation of wear versus cycles of oscillation of a self-lubricated liner provided by the present invention.

With a load applied to the sleeve bearing, and the bore pin oscillating against the liner, the wear of the self-lubricated liner was monitored by the use of mechanical dial indicators, 0.0001 inch measurable increment, at each station. The testing machines were halted at convenient intervals to take wear readings of the self-lubricated liner when appropriate. The wear readings of the self-lubricated liner were plotted on an X-Y graph to give a graphical representation of wear versus cycles of oscillation (FIG. 9). Comparative Example—Bearings With Self-lubricating Thermosetting Acrylate Liners wore an average of 0.006 inches in 27,000 cycles while the Bearings having a self-lubricating surface coating composition in accordance with the present invention, containing at least one cured thermosetting acrylate and at least one phenolic resin, required an average of 65,000 cycles to reach 0.006 inches of wear. Therefore, the machined and postcured inventive Example 3 bearings lasted, on average, 2.3 times longer than the machined and postcured Example 2 bearings.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

We claim:

1. A method for making a bearing, wherein the bearing comprises a substratum and a self-lubricating surface coating composition, wherein the self-lubricating surface coating composition further comprises at least one cured thermosetting acrylate and at least one phenolic resin, wherein the method comprises disposing the phenolic resin on the substratum and disposing the thermosetting acrylate on the phenolic resin coated substratum.

2. The method of claim 1, wherein the phenolic resin is a mixture of phenolic resin and polyvinyl formal resin.

3. The method of claim 1, further comprising:
drying the phenolic resin; and
disposing the thermosetting acrylate on the dried phenolic resin coated substratum.

4. The method of claim 1, further comprising:
drying the phenolic resin;
disposing the thermosetting acrylate on the dried phenolic resin coated substratum; and
curing the phenolic resin and the thermosetting acrylic.

5. The method of claim 1, wherein the self-lubricating surface coating composition further comprises a lubricant selected from the group consisting of polytetrafluoroethylene fibers, polytetrafluoroethylene floc, polytetrafluoroethylene powder, graphite, molybdenum disulfide, tungsten disulfide, boron nitride, copper, talc, perfluoropolyethers, silicone fluids, oils, waxes, and combinations thereof.

6. The method of claim 1, wherein the self-lubricating surface coating composition further comprises reinforcing fillers selected from the group consisting of glass fibers, carbon fibers, aramid fibers, wool fibers, polyester fibers, polymer fibers, mineral fillers, and combinations thereof.

7. The method of claim 1, wherein said phenolic resin on said substratum comprises a mixture of phenolic resin and thermosetting acrylate.

8. The method of claim 1, wherein said phenolic resin on said substratum comprises a mixture of phenolic resin and thermosetting acrylate and said thermosetting acrylate disposed on said phenolic resin comprises a mixture of thermosetting acrylate and phenolic resin.

9. The method of claim 1, wherein the phenolic resin is disposed upon the substratum in a fluid state.

10. The method of claim 1, further comprising the step of roughening the substratum surface prior to applying the phenolic resin.

11. The method of claim 10, wherein roughening further comprises imparting a random or specific roughness pattern to the substratum surface by one of the group consisting of grit blasting with an abrasive media, chemical etching, plasma or electrical discharge etching, and mechanical roughening.

* * * * *